Jan. 22, 1957   G. L. N. MEYER   2,778,479
CONVEYOR FOR SPRAY TYPE PASTEURIZER
Filed Jan. 21, 1953   3 Sheets-Sheet 2
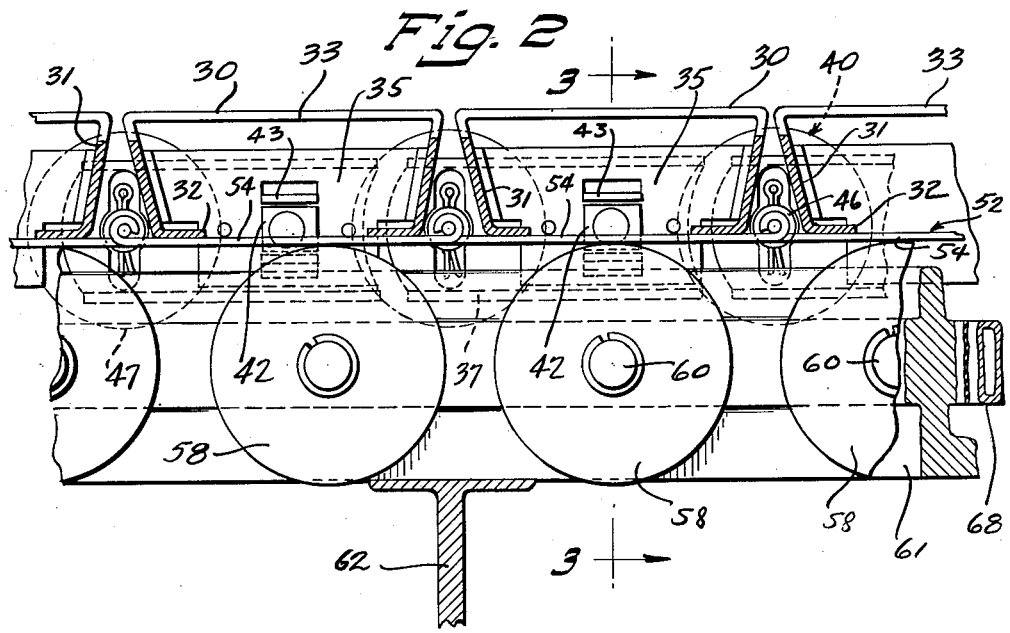
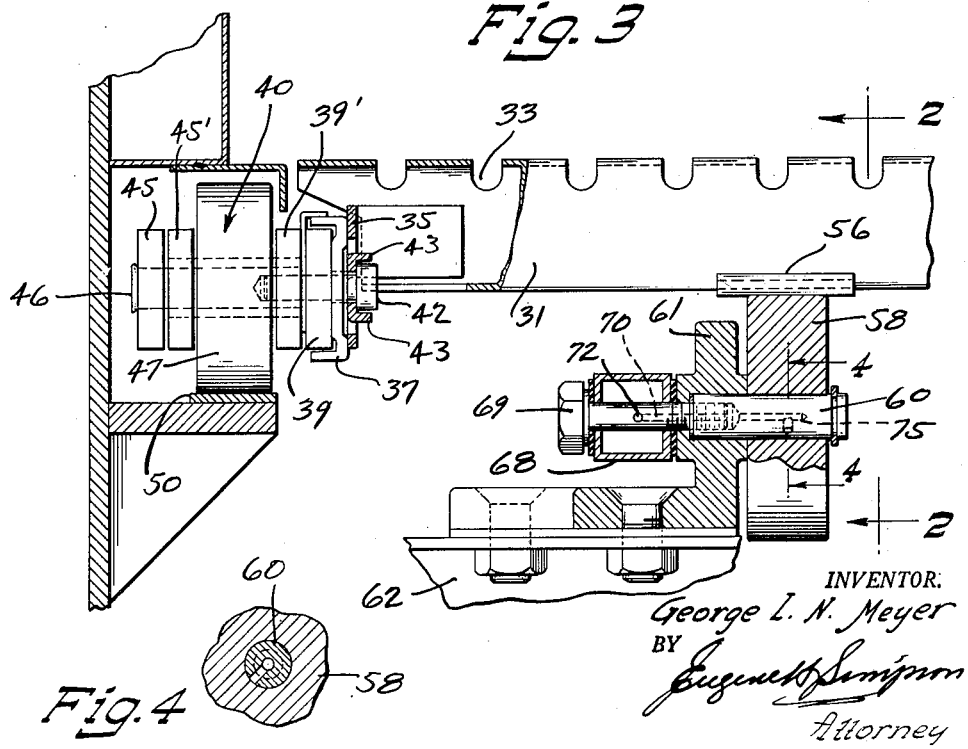
INVENTOR.
George L. N. Meyer
BY
Attorney Jan. 22, 1957  G. L. N. MEYER  2,778,479
CONVEYOR FOR SPRAY TYPE PASTEURIZER
Filed Jan. 21, 1953  3 Sheets-Sheet 3

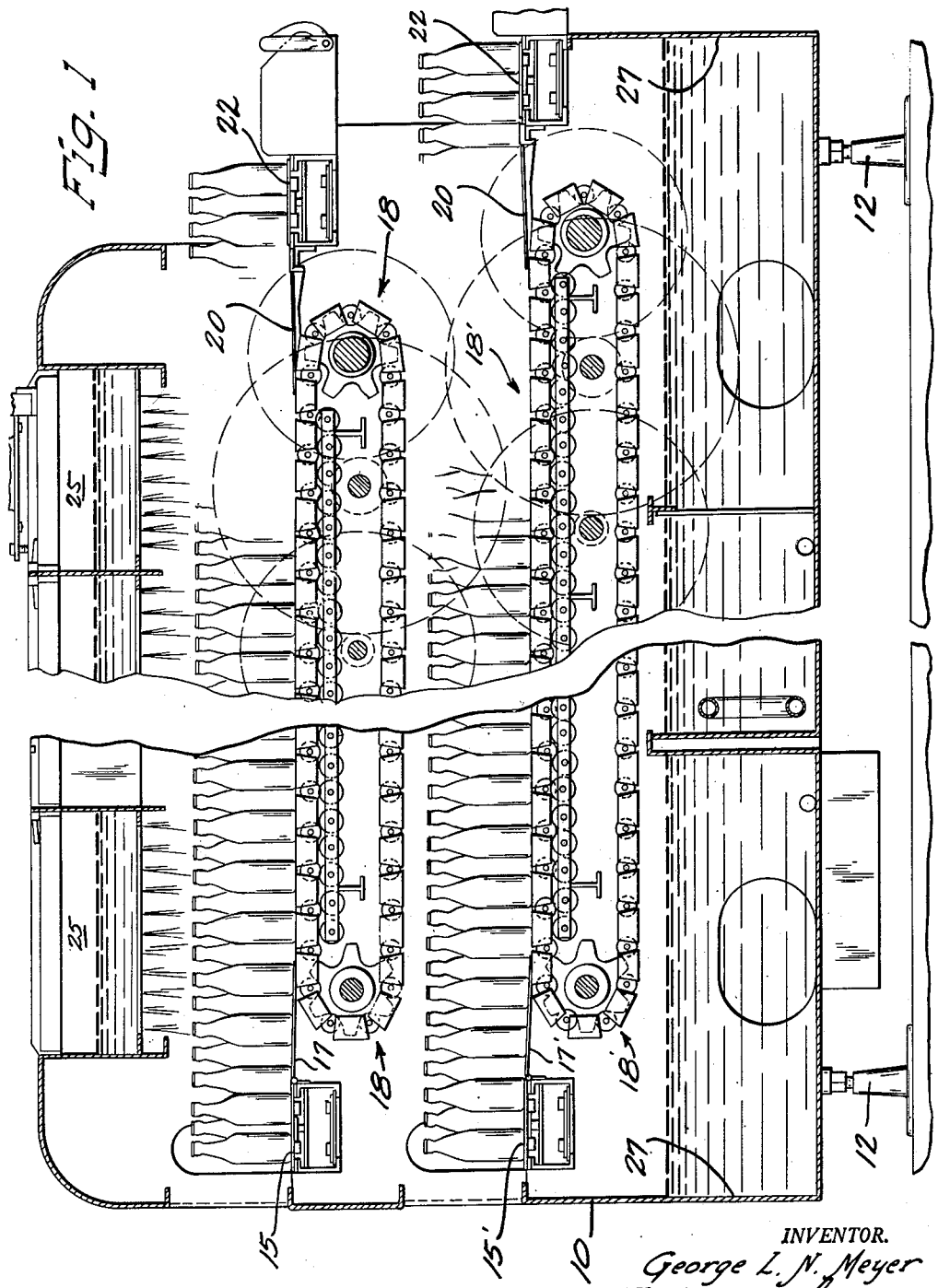

INVENTOR.
George L. N. Meyer
BY
Attorney

United States Patent Office 2,778,479
Patented Jan. 22, 1957

2,778,479

CONVEYOR FOR SPRAY TYPE PASTEURIZER

George L. N. Meyer, Milwaukee, Wis., assignor to Geo. J. Meyer Manufacturing Company, Cudahy, Wis., a corporation of Wisconsin Application January 21, 1953, Serial No. 332,151

8 Claims. (Cl. 198—195)

This invention relates to conveyors and more particularly to a relatively wide endless conveyor adapted to sustain relatively heavy loads.

Spray type pasteurizers employ endless conveyors which carry containers horizontally through the machines with the return flight of the conveyors being beneath and parallel to the forward or work flight.

The conveyor itself, in such pasteurizers, is usually composed of a plurality of relatively long narrow inverted channel-shaped plates having slots cut across the upper face of the channel to accommodate take-off fingers.

It is an object of the present invention to provide a pasteurizer of the spray type in which the total load on the conveyor is distributed uniformly between several supports.

Another object is to provide a light weight conveyor which will transport relatively heavy loads.

Another object is to provide a multi-tier spray type pasteurizer in which the overall height of the machine is a minimum.

Another object of the invention is to provide a conveyor for a spray type pasteurizer in which a minimum vertical space is occupied by the conveyor.

A further object is to provide a heavy duty conveyor for a multi-tier spray type pasteurizer in which the vertical space occupied by the conveyor is a minimum.

A further object is to provide a conveyor in which the conveyor plates are supported intermediate the sides of the pasteurizer on fixed roller supports.

A still further object is to provide an intermediate transverse support for a conveyor which may be lubricated readily.

A still further object is to provide an intermediate transverse roller support for a spray type pasteurizer in which lubricant for the rollers does not contaminate the pasteurizing medium.

A still further object is to provide continuous rolling support for a conveyor intermediate the ends thereof.

Still further objects will become apparent upon considering the following specification, which, when taken in conjunction with the accompanying drawings illustrates a preferred form of the invention.

In the drawings:

Fig. 1 is a partial vertical longitudinal cross-section through one side of a two tier spray type pasteurizer illustrating the invention;

Fig. 2 is an enlarged fragmentary longitudinal cross-section through a conveyor showing the details of the intermediate transverse support;

Fig. 3 is a cross-section taken on the line 3—3 of Fig. 2, looking in the direction of the arrows;

Fig. 4 is a cross-section taken on the line 4—4 of Fig. 3, looking in the direction of the arrows;

Figure 5:
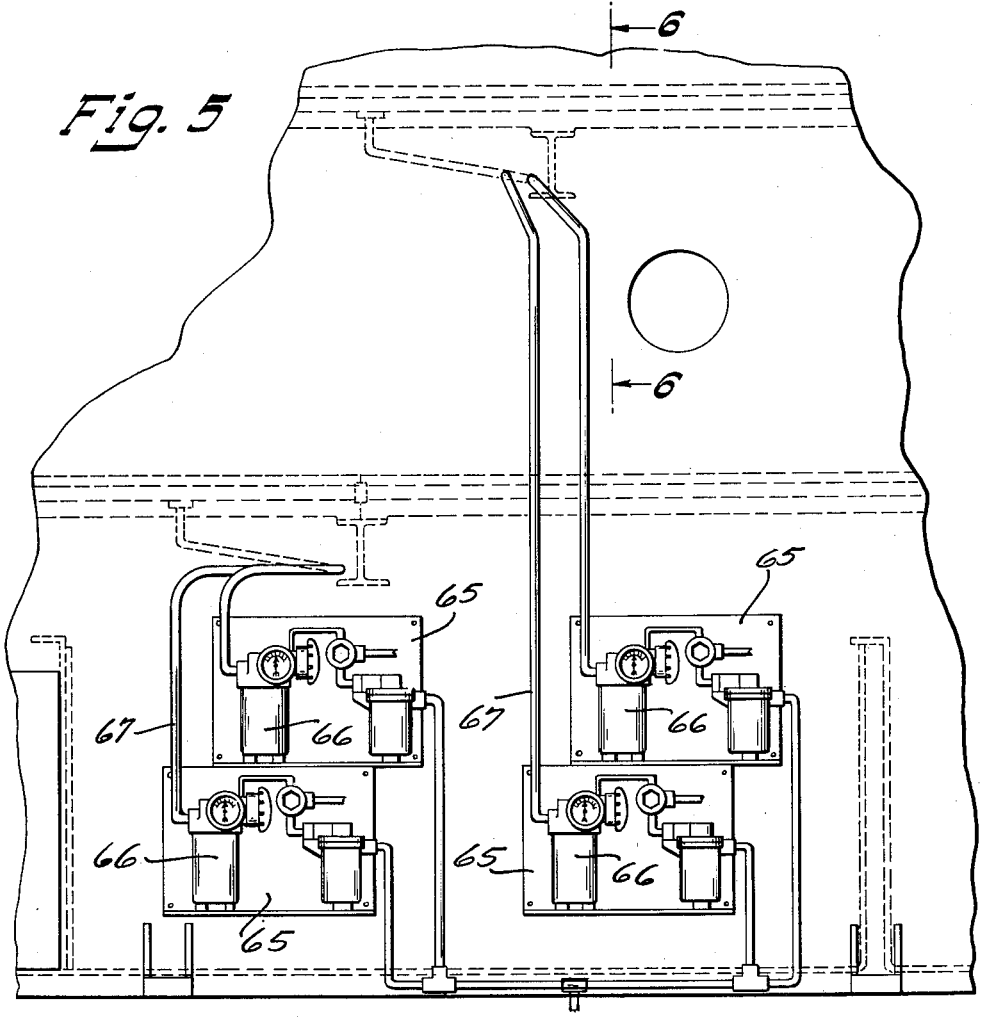
Fig. 5 is an elevational view of the lubricating system for the conveyor.
Figure 6:
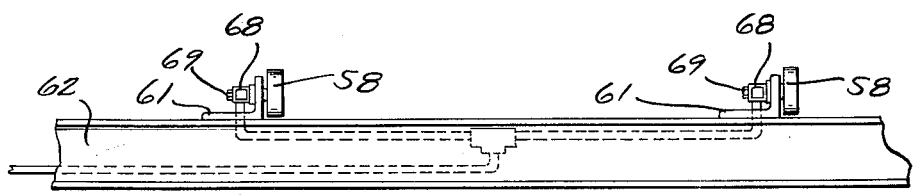
Fig. 6 is a cross-section taken on the line 6—6 of Fig. 5.

Referring to the drawings, the pasteurizer may comprise a generally box-shaped exterior, or casing, 10, supported from a base by a plurality of adjustable footings 12—12, which footings may be raised or lowered to level the pasteurizer as well as compensate for irregularities in the floor surface.

The pasteurizer shown has two tiers at which pasteurizing is effected.

The upper tier has an inlet conveyor 15 which enters one side of the machine and runs transversely across the width of the machine. The containers entering the machine on the conveyor 15 are forced off the conveyor 15 and across a stationary plate 17 onto a pair of main conveyors, generally designated 18, which transport the containers longitudinally through the pasteurizer.

At the discharge end of the conveyor, the containers are forced off the conveyors 18 onto take-off plates 20, which are supported at the discharge end adjacent a transverse discharge conveyor 22. The loading end of the take-off plates rides on the surface of the conveyors 18 and has a plurality of fingers which extend below the surface of the conveyors 18 to receive and guide the containers onto the take-off plates 20.

Movement of the containers across the plates 20 and onto the conveyor 22 is accomplished by the pressure of succeeding containers carried by the conveyors 18.

In the lower tier the conveyors are identical to those of the upper tier just described except as to the length of the longitudinal conveyor 18. The lower tier comprises a transverse intake conveyor 15' which brings the containers into the pasteurizer, and discharges them onto a stationary plate 17' across which the containers are forced by pressure of subsequent containers moving off the conveyor 15'. The containers then move off the plate 17' onto the longitudinal conveyor 18' which transports the containers under the pasteurizing spray, and delivers them to the take-off plates 20' and to the discharge conveyor 22'.

To effect pasteurization, water at varying temperatures is supplied from tanks 25 positioned above the top of the upper tier. The tanks 25 contain, successively, water at less than pasteurizing temperature to preheat the containers, water at above pasteurizing temperature to raise the temperature of the container contents quickly to pasteurizing temperature, water at pasteurizing temperature to effect pasteurization, and a succession of tanks of cool water to cool the contents of the containers after a suitable pasteurizing period.

The bottoms of the tanks 25 are provided with a plurality of small holes through which the water in the tanks flows to provide a large number of sprays which cascade over the containers on the upper tier, passes through the conveyor 18 and over the containers on the lower tier. From there the water passes through the conveyor 18' and drops into collecting tanks 27.

The water collected in the tanks 27 is recirculated to the tanks 25 at the proper temperature for reuse.

It is highly desirable in such a multi-tier pasteurizer that the conveyors 18 and 18' occupy as little space vertically as possible so that the overall height of the pasteurizer is maintained at a minimum.

Refer now to Figs. 2, 3 and 4 for details of the conveyors 18 and 18'. The conveyors 18 and 18' are identical except for length, and for this reason, but one will be described.

The conveyor 18 is composed of a plurality of elongated substantially channel-shaped carrier plates 30 with the legs 31 converging slightly, and having the free ends thereof turned in toward each other parallel to the carrying surface, as shown at 32.

The top or carrying surface of the carriers 30 is provided with slots 33 extending longitudinally of the direction of travel of the conveyor. The slots 33 receive fingers on the bottom of the take-off plates 20 which guide the containers off the conveyor and onto the plates 20.

Each of the ends of the carriers is provided with a bracket 35. The brackets 35 are secured to the carrier plates 30 by welding. The plates 30 have channel-shaped chain retainers 37 welded to the outside thereof, each of the retainers 37 receiving an inner link 39 of a carrier chain 40. The retainers 37 are secured to the links 39 by means of bolts 42, the heads of which are secured between inturned tabs 43 formed from the brackets 35.

As seen in Fig. 3, the chain 40 comprises a plurality of elements, each element comprising the inner link 39 and an outer link 45. The inner link 39 and outer link 45 are mounted on a common pivot 46 with corresponding links on both ends thereof, with a roller 47 rotatably mounted on the pivot 46 between the links.

The rollers 47 ride on a track 50 and support the ends of the carrier plates therefrom. The tracks are carried by the sides of the casing 10 of the pasteurizer. On the return flight the rollers 47 ride on a track (not shown) parallel to but below the track 50.

The center of the conveyors 18 and 18' are provided with a plurality of flexible supports 52 intermediate the ends thereof. The flexible supports each comprise a plurality of flat alined plates 54 each plate being secured to the outer free ends 32 of the legs 31 of the carrier plates and extending beyond the legs 31 and connecting to the next plate by a hinged joint 56 so that the plates 54 present a continuous flat surface adapted on the forward or work flight of the conveyor 18 or 18' to ride on a plurality of rollers 58.

The rollers 58 are mounted on axles 60 carried in angle irons 61. The angle irons 61 run lengthwise of the machine and are supported on transverse structural members 62 carried by the sides 10 of the pasteurizer. The rollers are spaced on a pitch of less than the width of one of the plates 54 so that as the flexible supports 52 ride over the rollers there is always at least one roller under each link 54 of the flexible support and there is no tendency of the conveyor 18 to dip between the rollers 58.

The rollers 58 are lubricated by oil mist lubricators 65, four of which are shown in Fig. 5. The oil mist system comprises an oil mist generator 66 which atomizes the oil and mixes it with air. The oil, in mist form, is transmitted through pipes 67 to a header 68 carried by the angles 61. A plurality of bolts 69 pass through the header and engage in threads in each of the axles 60 of the rollers 58 so that the bolts 69 not only retain the header 68 in position on the angle iron 61 but retain the axles 60 in position also.

A central aperture 70 communicates through a transverse aperture 72 in the bolt 69 with the interior of the header 68 so that the oil mist traveling from the generator 66 through the pipes 67 and through the header 68 pass into the aperture 72 through the aperture 70 and into a communicating aperture 73 in the axle 60 and onto the bearing surface between the axle 60 and the roller 58.

It will be understood that the hereinbefore described form of the invention is to be taken merely as a preferred embodiment thereof and that various changes in size, shape and arrangement of parts may be resorted to without departing from the spirit of the invention or the scope of the subjoined claims.

That which is claimed as new and is desired to be secured by United States Letters Patent is:

1. A conveyor for a spray type pasteurizer or the like, said pasteurizer including a casing, said conveyor comprising a plurality of elongated conveyor elements having inwardly and downwardly sloping sides, a conveyor chain comprising a plurality of links pivoted together between the inner divergent ends of the sides, a roller mounted between each of the conveyor elements on the chain pivots, means carried by the casing to support the conveyor adjacent the sides thereof through said roller, a flat plate member carried by each of said conveyor elements intermediate the sides of the conveyor, pivot pins connecting the said plates intermediate the conveyor elements on axes coaxial with said rollers, to form a continuous flexible intermediate support between the sides of the conveyor, and means carried by the casing contacting the flexible support to prevent buckling of the conveyor elements.

2. A conveyor for a spray type pasteurizer or the like, said pasteurizer including a casing, said conveyor comprising a plurality of elongated conveyor elements having inwardly and downwardly sloping sides, a conveyor chain comprising a plurality of links pivoted together between the inner divergent ends of the sides, a roller mounted between each of the conveyor elements on the chain pivots, means carried by the casing to support the conveyor adjacent the sides thereof through said roller, a flat plate member carried by each of said conveyor elements intermediate the sides of the conveyor, pivot pins connecting the said plates intermediate the conveyor elements on axes coaxial with said rollers, to form a continuous flexible intermediate support between the sides of the conveyor, and a plurality of rollers carried by the casing contacting the flexible support to prevent buckling of the rollers.

3. A conveyor for a spray type pasteurizer or the like, said pasteurizer including a casing, said conveyor comprising a plurality of elongated conveyor elements having inwardly and downwardly sloping sides, a conveyor chain comprising a plurality of links pivoted together between the inner divergent ends of the sides, a roller mounted between each of the conveyor elements on the chain pivots, means carried by the casing to support the conveyor adjacent the sides thereof through said roller, a flat plate member carried by each of said conveyor elements intermediate the sides of the conveyor, pivot pins connecting the said plates intermediate the conveyor elements on axes coaxial with said rollers, to form a continuous flat intermediate support between the sides of the conveyor, a plurality of rollers fixedly mounted to revolve below said first support in said casing and support the conveyor intermediate its sides.

4. A conveyor for a spray type pasteurizer or the like, said pasteurizer including a casing, said conveyor comprising a plurality of elongated conveyor elements having inwardly and downwardly sloping sides, a conveyor chain comprising a plurality of links pivoted together between the inner divergent ends of the sides, a roller mounted between each of the conveyor elements on the chain pivots, means carried by the casing to support the conveyor adjacent the sides thereof through said roller, a flat plate member carried by each of said conveyor elements intermediate the sides of the conveyor, pivot pins connecting the said plates intermediate the conveyor elements on axes coaxial with said rollers, to form a continuous flexible intermediate support between the sides of the conveyor, a plurality of rollers spaced at intervals less than the length of the flat plates carried by the casing to support the conveyor intermediate the sides thereof.

5. A conveyor for a spray type pasteurizer or the like, said pasteurizer including a casing, said conveyor comprising a plurality of elongated conveyor elements having inwardly and downwardly sloping sides, a conveyor chain comprising a plurality of links pivoted together between the inner divergent ends of the sides, a roller mounted between each of the conveyor elements on the chain pivots, means carried by the casing to support the conveyor adjacent the sides thereof through said roller, a flat plate member carried by each of said conveyor elements intermediate the sides of the conveyor, pivot pins connecting the said plates intermediate the conveyor elements on axes coaxial with said rollers, to form a continuous flat intermediate support between the sides of the conveyor, and means carried by the casing contacting the flat support to prevent buckling of the conveyor elements.

6. A conveyor for a spray type pasteurizer or the like, said pasteurizer including a casing, said conveyor comprising a plurality of elongated conveyor elements having inwardly and downwardly sloping sides, a conveyor chain comprising a plurality of links pivoted together between the inner divergent ends of the sides, a roller mounted between each of the conveyor elements on the chain pivots, means carried by the casing to support the conveyor adjacent the sides thereof through said rollers, a flat plate member carried by each of said conveyor elements intermediate the sides of the conveyor, pivot pins connecting the said plates intermediate the conveyor elements on axes coaxial with said rollers, to form a continuous flat intermediate support between the sides of the conveyor, and a plurality of rollers carried by the casing contacting the flat support to prevent buckling of the rollers.

7. A conveyor for a spray type pasteurizer or the like, said pasteurizer including a casing, said conveyor comprising a plurality of elongated conveyor elements having inwardly and downwardly sloping sides, a conveyor chain comprising a plurality of links pivoted together between the inner divergent ends of the sides, a roller mounted between each of the conveyor elements on the chain pivots, means carried by the casing to support the conveyor adjacent the sides thereof through said rollers, a flat plate member carried by each of said conveyor elements intermediate the sides of the conveyor, pivot pins connecting the said plates intermediate the conveyor elements on axes coaxial with said rollers, to form a continuous flat intermediate support between the sides of the conveyor, a plurality of rollers fixedly mounted to revolve below said flat support in said casing and support the conveyor intermediate its ends.

8. A conveyor for a spray type pasteurizer or the like, said pasteurizer including a casing, said conveyor comprising a plurality of elongated conveyor elements having inwardly and downwardly sloping sides, a conveyor chain comprising a plurality of links pivoted together between the inner divergent ends of the sides, a roller mounted between each of the conveyor elements on the chain pivots, means carried by the casing to support the conveyor adjacent the sides thereof through said rollers, a flat plate member carried by each of said conveyor elements intermediate the sides of the conveyor, pivot pins connecting the said plates intermediate the conveyor elements on axes coaxial with said rollers, to form a continuous flat intermediate support between the sides of the conveyor, a plurality of rollers spaced at intervals less than the length of the flat plates carried by the casing and support the conveyor intermediate the sides thereof.

References Cited in the file of this patent
UNITED STATES PATENTS

| | | |
|---|---|---|
| 796,947 | Thomas | Aug. 8, 1905 |
| 812,374 | Smead | Feb. 13, 1906 |
| 1,641,515 | Williams | Sept. 6, 1927 |
| 2,180,284 | Meyer | Nov. 14, 1939 |
| 2,539,792 | Neimitz | Jan. 30, 1951 |